US009888806B2

(12) United States Patent
Van Belleghem et al.

(10) Patent No.: US 9,888,806 B2
(45) Date of Patent: Feb. 13, 2018

(54) CAPSULE, DEVICE, AND METHOD FOR PREPARING INFUSED BEVERAGES

(71) Applicant: TCONCEPT COMPANY S.P.R.L., Corroy-le-Grand (BE)

(72) Inventors: Luc Van Belleghem, Corroy-le-Grand (DE); Jacco Van Stenis, Corroy-le-Grand (BE); Quintijn Innikel, Corroy-le-Grand (BE)

(73) Assignee: TCONCEPT COMPANY S.P.R.L., Corroy-le-Grand (BE)

(*) Notice: Subject to any disclaimer, the term of this patent is extended or adjusted under 35 U.S.C. 154(b) by 0 days.

(21) Appl. No.: 15/419,417

(22) Filed: Jan. 30, 2017

(65) Prior Publication Data

US 2017/0135517 A1 May 18, 2017

Related U.S. Application Data

(60) Continuation of application No. 14/988,823, filed on Jan. 6, 2016, now abandoned, which is a division of application No. 12/989,287, filed as application No. PCT/EP2009/054975 on Apr. 24, 2009, now Pat. No. 9,382,063.

(30) Foreign Application Priority Data

Apr. 24, 2008 (EP) .................................. 08103706
Aug. 27, 2008 (EP) .................................. 08163120

(51) Int. Cl.
*B65D 85/804* (2006.01)
*A47J 31/40* (2006.01)
*A47J 31/36* (2006.01)

(52) U.S. Cl.
CPC ......... *A47J 31/407* (2013.01); *A47J 31/3628* (2013.01); *B65D 85/8043* (2013.01)

(58) Field of Classification Search
CPC .......................... B65D 85/8043; A47J 31/407
See application file for complete search history.

(56) References Cited

U.S. PATENT DOCUMENTS

| | | | |
|---|---|---|---|
| 2006/0110507 A1 | 5/2006 | Yoakim et al. | |
| 2007/0181005 A1 | 8/2007 | Kirschner et al. | |
| 2007/0224319 A1 | 9/2007 | Yoakim et al. | |
| 2008/0038441 A1 | 2/2008 | Kirschner | |

FOREIGN PATENT DOCUMENTS

| | | |
|---|---|---|
| FR | 2 330 250 A | 5/1977 |
| WO | 2008/025785 A2 | 3/2008 |

*Primary Examiner* — Erik Kashnikow
*Assistant Examiner* — Chaim Smith
(74) *Attorney, Agent, or Firm* — Sughrue Mion, PLLC

(57) ABSTRACT

A device 120 for preparing infused beverages including: a capsule 102, with the front face 103 in a substantially vertical position; an injector 124 for introducing an infusing liquid into the capsule 102 through the frangible region 116 when the capsule 102 is in the receptacle 118; and an infusion vessel 123 with a substantially vertical side opening 125 to the receptacle 118, so as to be in fluid connection with the filter wall 114 of the capsule 102 when the capsule 102 is in the receptacle 118, and an openable and closable bottom opening 127 to allow an infused beverage to flow out of the infusion vessel 123.

9 Claims, 9 Drawing Sheets

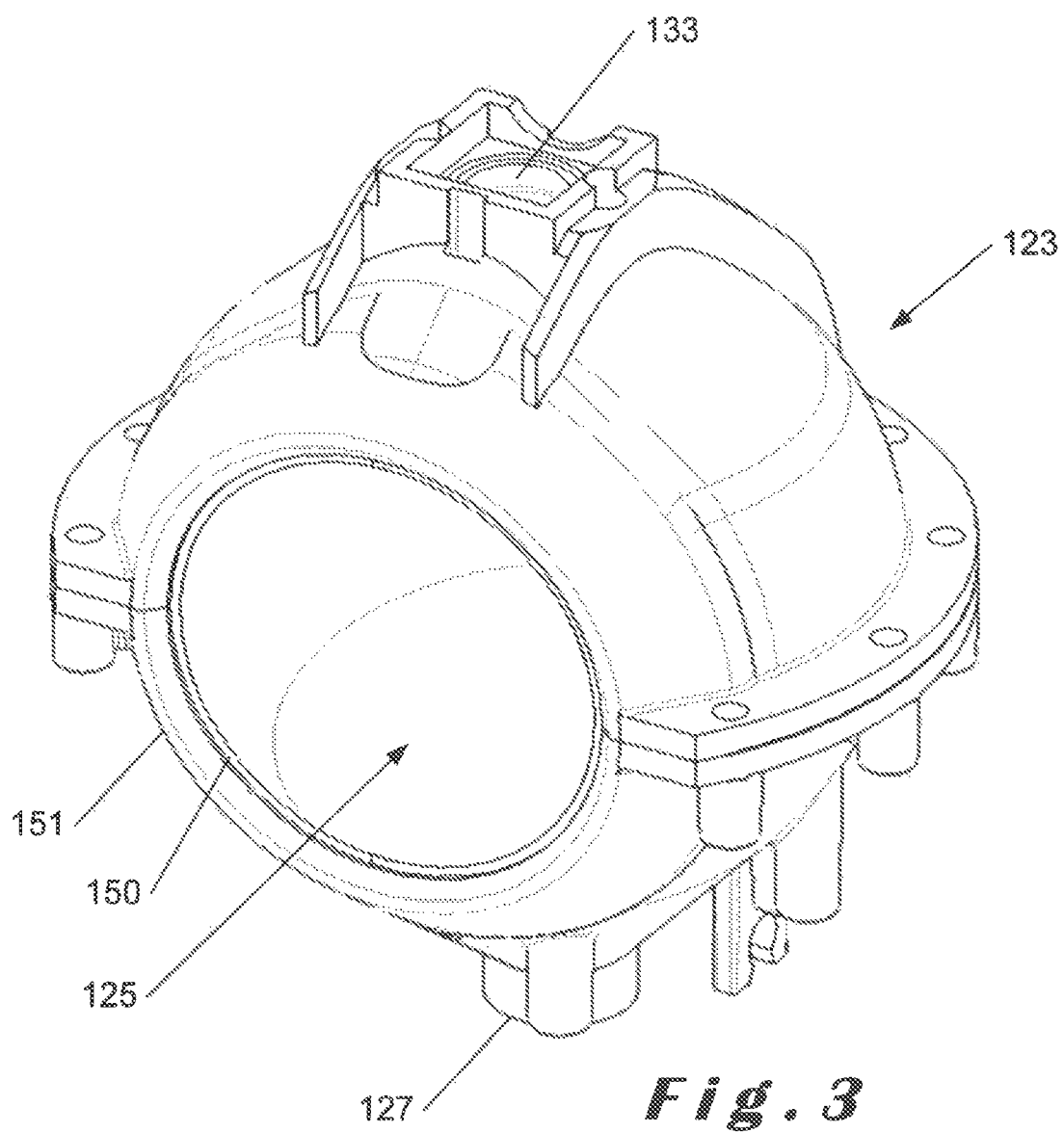

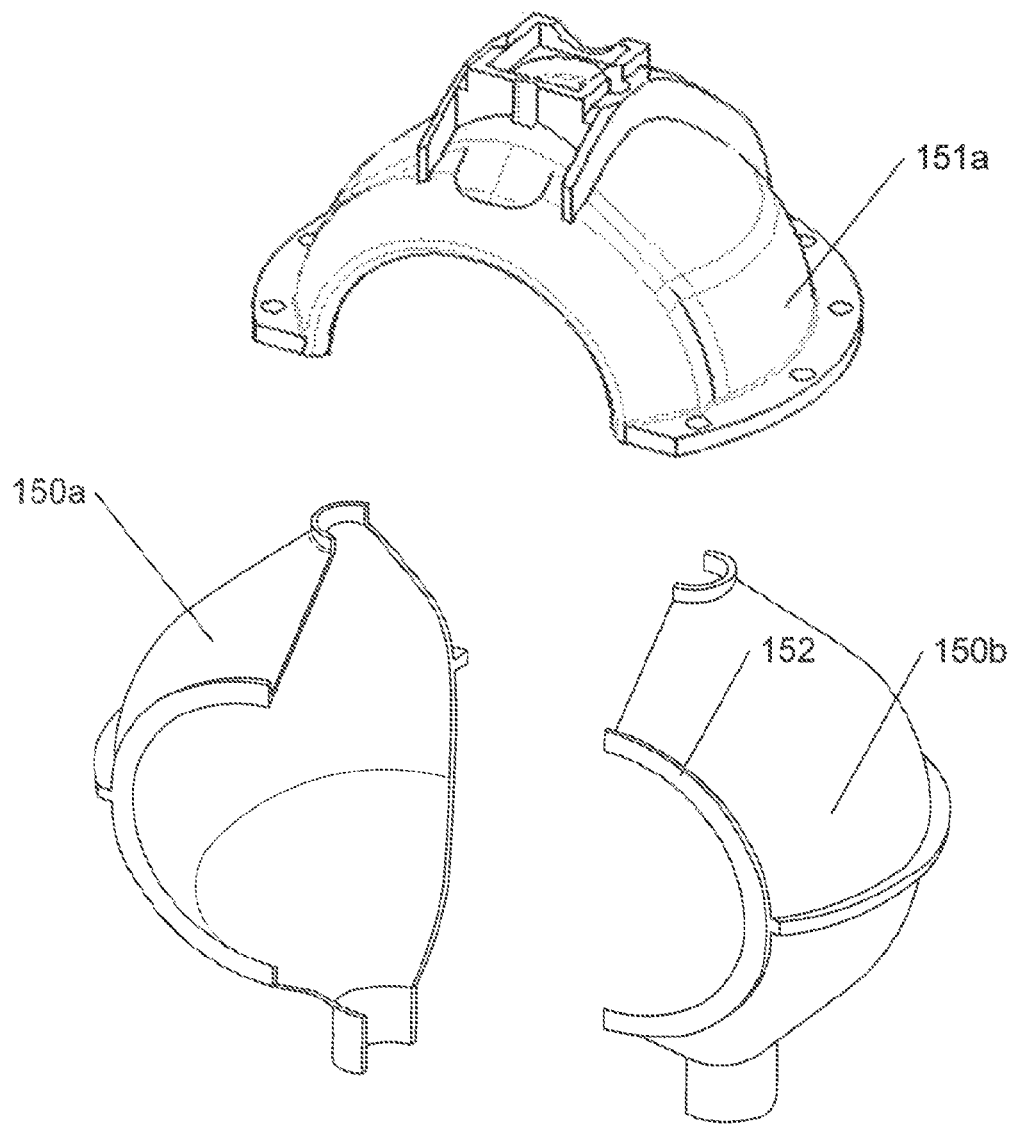
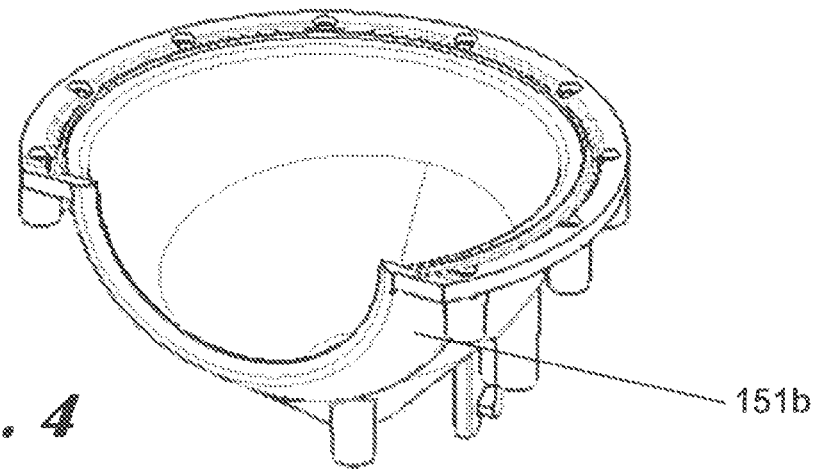
Fig. 4

CAPSULE, DEVICE, AND METHOD FOR PREPARING INFUSED BEVERAGES

CROSS-REFERENCE TO RELATED APPLICATIONS

This is a Continuation of U.S. application Ser. No. 14/988,823, filed Jan. 6, 2016, which is a Divisional of U.S. patent application Ser. No. 12/989,287, filed Apr. 20, 2011, now U.S. Pat. No. 9,382,063, which is a National Stage of International Application No. PCT/EP2009/054975 filed Apr. 24, 2009, claiming priority based on European Patent Application 08103706.1 filed on Apr. 24, 2008 and European Patent Application 08163120.0 filed on Aug. 27, 2008. The entire disclosures of the prior applications are considered part of the disclosure of the accompanying Continuation application, and are hereby incorporated by reference in their entirety.

BACKGROUND

The present invention relates to a capsule, device, and method for preparing infused beverages.

In particular, the present invention relates to a capsule containing dry infusible matter for preparing infused beverages, and comprising a front face, comprising a filter wall and a rim; a back face substantially opposed to said front face along a main longitudinal axis of the capsule, and comprising a frangible region for the injection of infusion liquid; and a solid envelope between said front face and said back face.

In the present specification, the term "capsule" is preferentially used, although it should be considered synonymous with the terms "cartridge", "package" or "container" used elsewhere in this particular technical domain.

The present invention also relates to a device for preparing infused beverages comprising the abovementioned capsule; an infusion vessel; and injecting means for introducing an infusing liquid into said capsule.

In the present specification, the term "infusing liquid" generally refers to the liquid used to infuse ingredients contained in the dry infusible matter, so as to produce an infused beverage wherein said infusing liquid carries said ingredients in dissolved or suspended form. Usually, but not necessarily, the infusing liquid will be hot water, and the infused beverage a tea, such as black tea, green tea, white tea, flavoured tea, or also a so-called herbal or fruit tea using infusible matter other than the leaves of the tea plant (for instance, rooibos, camomile, peppermint, etc.).

Similar capsules and devices are known from the state of the art.

Canadian patent application CA 2 448 474 A1 discloses one such capsule. However, this capsule presents several drawbacks. The capsule disclosed in this document is particularly adapted to use for preparing beverages by percolation, in which a hot liquid percolates down continuously through the matter contained in the capsule. For this, the capsule is placed in a horizontal position, with the back face comprising the liquid injection point at the top, and the front face at the bottom. This method, though appropriate for preparing such beverages as coffee, is entirely inappropriate for, for instance, tea, which requires a longer and gentler infusion. With the infusing liquid flowing too rapidly downwards under the influence of gravity, it provokes a chaotic and exceedingly fast breakdown of various tea molecules, ruining the quality and flavour of the infusion.

In order to solve this problem, it has been proposed to place such capsules against a side opening of an infusion vessel. However, such a position has the drawback of being considerably more leak-prone than one in which the front face remains in a substantially horizontal position.

This problem has been addressed in a number of similar capsules for preparing coffee by incorporating a sealing ring in the rim around the front face, as disclosed, for instance, in WO 2007/137974, WO 2007/122208, or EP 0 468 079. However, these prior art capsules are adapted to the preparation of espresso coffee by injecting water at high pressure into the capsule and extracting it at the front face, as illustrated in FIG. 1. Since the water injection point 1 and the back face 2 of the capsule 3 are not sealed, the high-pressure water 4 both percolates through the ground coffee in the capsule 3 and flows around the envelope 5 of the capsule 3. In use, the water pressure thus pushes the capsule 3 forward, pressing the front of the rim 6 against an opposite surface 7 of the receptacle receiving the capsule 3. The principal purpose of the sealing rings in these prior art capsules is to prevent leaks of high-pressure water 4 from behind the rim 6.

In prior art document EP 1 929 904 A, one of the embodiments of the capsule presents a backwards taper of the rim. This rim, however, is resiliently deflectable, for preventing leaks of high-pressure water from behind the rim.

SUMMARY OF THE INVENTION

The capsule of the present invention, however, is adapted to be used in a device for preparing infused beverages comprising an infusion vessel with a side opening to said receptacle, so as to be in fluid connection with said filter wall of the capsule when said capsule is in said receptacle, and an openable and closable bottom opening to allow an infused beverage to flow out of the chamber. When the infusion vessel is full, it is necessary to prevent leaks of infusion liquid from the front of the capsule.

It is thus an object of the present invention to provide a capsule adapted to prevent such leaks through the front of the rim of the capsule.

The capsule of the present invention is adapted to solve this problem with a rim presenting an outer edge with a backwards-oriented annular lip behind a substantially straight backwards taper, said annular lip presenting an outer perimeter surface connected to said taper and substantially parallel to said main longitudinal axis. The backwards-oriented annular lip stiffens the rim and its outer perimeter surface guides the capsule axially, ensuring a self-adjusting sealing fit when said backwards taper is pressed against the edge of the abovementioned side opening of the infusion vessel. Liquid leaks through the interface between the capsule and the infusion vessel are thus successfully prevented without unduly complicating the production of the capsule.

It is a further object of the present invention to prevent liquid leaking out from around the liquid injection point.

Advantageously, the capsule of the present invention may thus also present, a tapered outer edge around its back face. Besides ensuring a self-adjusting sealing fit around the liquid injection point when a corresponding edge of a receptacle receiving the capsule presses against it, it transmits to the capsule the force pressing the first sealing surface against the abovementioned side opening of the infusion vessel. The capsule can thus be clamped between the tapered outer edge of the rim and the tapered outer edge of the back face.

A further object of the present invention is to ensure the freshness of the dry infusible matter within the capsule.

Advantageously, the rim of the capsule of the present invention may thus also present a substantially flat front surface, and a freshness seal in the form of a foil fixed to said substantially flat front surface so as to close the capsule in a substantially gas-tight manner.

Even more advantageously, to preserve the freshness of the dry infusible matter, said capsule may contain the dry infusible matter in a substantially inert atmosphere.

Also more advantageously, to provide support for the filter wall, the envelope of the capsule may comprise, behind said rim, an inwards step presenting a substantially flat surface on which said filter wall is fixed.

It is a further object of the present invention to provide an effective filter wall for said capsule. Advantageously, said filter wall may thus be formed by a plastic mesh.

It is a further object of the present invention to provide a hygienic, taste-neutral, stable and inexpensive capsule. Advantageously, the capsule may thus be substantially made of a plastic material, which reduces the production costs, while providing a hygienic and taste-neutral container. By "plastic material" should be understood a polymer-based material, such as a thermoplastic polymeric material. Alternatively, any other material suitable for contact with hot drinks for human consumption could also be used.

Particularly advantageously, the capsule may be produced by injection moulding.

Although in a first embodiment of the invention the capsule is rotationally symmetrical, in an alternative embodiment a lower side of the envelope may present an angle α with respect to said front face that is lower than 90°, and preferably lower than 70°, whereas an upper side of said envelope, substantially opposed to said lower side, may present an angle β with respect to said front face that is substantially higher than said angle α, although preferably lower than 90°. The slope of the lower side facilitates the evacuation of high density infusion liquor out of the capsule. With the flatter upper side, the bulk of the capsule remains however within reasonable limits. Moreover, the asymmetric shape of this alternative embodiment of the capsule has additional advantages. For instance, because of this asymmetric shape, the capsule may only be used in a single well-defined position, preventing user confusion without duplication of elements within the capsule.

Advantageously, said front face may also comprise, substantially opposed to said frangible area, a solid deflector wall. In use, such a solid deflector wall will deflect a jet of infusing liquid injected into the capsule through said liquid injection point. The major part of the liquid will thus not directly escape the capsule, but indirectly flow onto the infusible matter at the bottom of the capsule, gently infusing it while still at a predetermined infusion temperature.

It is a further object of the present invention to provide an improved device for preparing infused beverages. This device comprises a capsule according to the invention; injecting means for introducing an infusing liquid into said capsule through said frangible region; and an infusion vessel having a side opening with a rim in substantially leak-tight engagement with said substantially straight backwards taper of the rim of the capsule. The infusion vessel provides an enlarged volume with respect to the capsule for carrying out the infusion process, so that a whole serving can be prepared in one go without requiring serving-sized capsules. The side opening between the infusion vessel and the capsule allows significant fluid exchange through natural convection during the infusion process, homogenising the infused beverage.

It is a further object of the present invention to provide a device that substantially prevents contamination of subsequent servings of infused beverage. For this purpose, said infusion vessel may preferably be made at least partially of a fluoropolymer material.

Advantageously, said infusion vessel may comprise an inner shell at least partially made of said fluoropolymer material, and encased in an outer shell of a different material. Since fluoropolymer materials are comparatively expensive to produce and/or handle, this allows the use of a reduced amount of such fluoropolymer materials for the production of an infusion vessel that combines the advantages of fluoropolymer materials for preventing contamination of subsequent servings, with the mechanical and thermal properties of whichever material is used for the outer shell.

It is a further object of the present invention to reduce the production cost of said infusion vessel. For this purpose, at least said inner shell may be moulded, preferably injection moulded.

Among the group of fluoropolymer materials, perfluoroalkoxy (PFA) plastic has the particular advantage of allowing the injection moulding of particularly thin shells. This reduces the amount and cost of the material needed to produce said inner shell by injection moulding.

The production of hollow bodies presents particular complications. To prevent this problem, said inner shell may comprise two inner half-shells divided by a first joint line, and said outer shell may comprise two outer half-shells divided by a second joint line.

Advantageously, said first and second joint lines may intersect at an angle γ higher than 30°, thus improving the leak-tightness of the infusion vessel.

It is a further object of the present invention to provide a device wherein the initial temperature of the capsule remains significantly close to ambient temperature, regardless of prior use of the infusion vessel. Advantageously, said capsule may be received in a receptacle of a capsule carrier having a significantly open structure, so that the capsule carrier absorbs only a small fraction of the heat of the capsule during the infusion process.

Advantageously, the device may also comprise cleaning means, such as a nozzle, for introducing a rinsing fluid into said infusion vessel. The infusion vessel can thus be cleaned, for instance after preparing each serving, thus preventing contamination of the following servings and ensuring their taste.

The present invention also relates to a method for preparing infused beverages, comprising the steps of placing a capsule according to the invention with the substantially straight backwards taper of its rim in a substantially leak-tight engagement with a side opening of an infusion vessel; injecting an infusing liquid into said capsule and the infusion vessel; infusing the infusing liquid with said infusible matter so as to produce an infused beverage; and discharging said infused beverage after said infusion step.

Advantageously, the method according to the invention may further comprise a second injection of infusing liquid into said capsule during said infusion step in order to agitate the infusible matter so as to obtain a more homogeneous infusion. This will facilitate the diffusion of a higher density of infusion molecules from around the infusible matter into the rest of the infusing liquid, and also reactivate the diffusion of infusion molecules from the infusible matter into the infusing liquid.

Advantageously, the method according to the invention may further comprise a cleaning step wherein a rinsing fluid is introduced and discharged from said infusion vessel.

Advantageously, the method according to the invention may further comprise a step of removing said capsule after said infused beverage is discharged from said infusion vessel.

In particular, said cleaning step may follow said capsule removing step, and the device according to the invention may comprise control means, such as, for example, an electronic circuit, for activating the capsule removing and cleaning steps in that order, and/or closing means, such as a lid, to close the abovementioned side opening during said cleaning step.

BRIEF DESCRIPTION OF THE DRAWINGS

Several preferred embodiments of the invention will be described illustratively, but not restrictively, with reference to the accompanying figures, in which:

FIG. 2b is a detail view of the rim of the capsule of FIG. 2a;

FIG. 3 shows a perspective view of the infusion vessel of FIG. 2a;

FIG. 4 shows an exploded view of the infusion vessel of FIG. 3;

FIGS. 7a to 7h show a number of alternative cross-sections for the capsule of FIG. 7a;

DETAILED DESCRIPTION OF THE INVENTION

Figure 1:
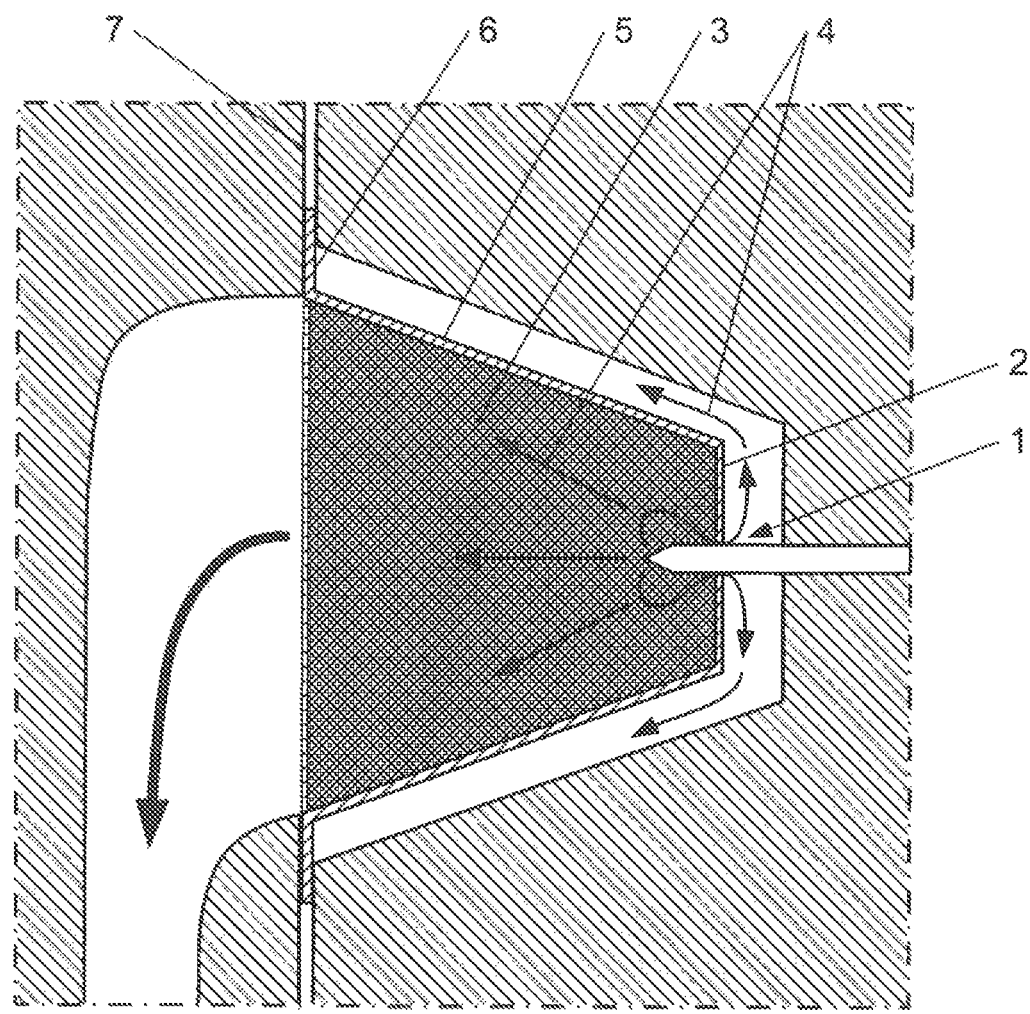
FIG. 1 is a longitudinal section through a prior art capsule in a device for preparing coffee.
Figure 2A:
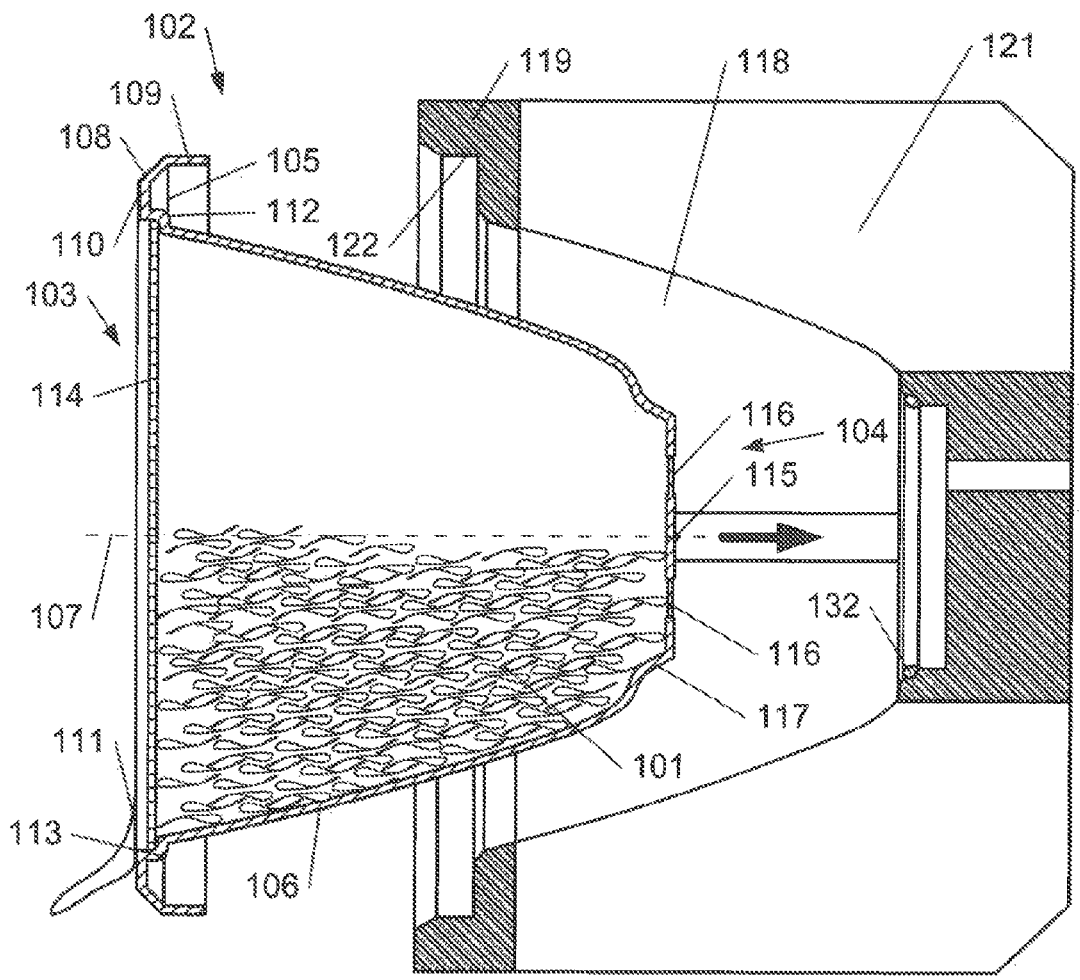
FIG. 2a is a longitudinal section through a first embodiment of a capsule according to the invention, as it is being received in a receptacle in a corresponding device.

A first embodiment of the invention is illustrated in FIG. 2a. An infusible dry matter 101, such as tea leaves, is contained within a capsule 102 with a front face 103, and a back face 104. A rim 105 surrounds said front face 103, and a solid envelope 106 extends from the rim 105 to the back face 104, enclosing the contents of the capsule 102. Preferably, the capsule 102 may be rotationally symmetrical around a central axis 107. In the preferred embodiment, the capsule 102 is made of plastic material by injection moulding, conferring it favourable properties of hygiene, taste neutrality, and form stability at a low production price. However, production processes and materials suitable for contact with hot drinks for human consumption could also be used would be considered by the skilled person according to the circumstances. The capsule 102 may also comprise an external indication of its precise content, for instance a machine-readable code, such as a colour code, a bar code or an RFID code, for indicating the nature of the infusible matter or a set of appropriate parameters for its infusion, such as temperature, duration, etc.

Figure 2B:
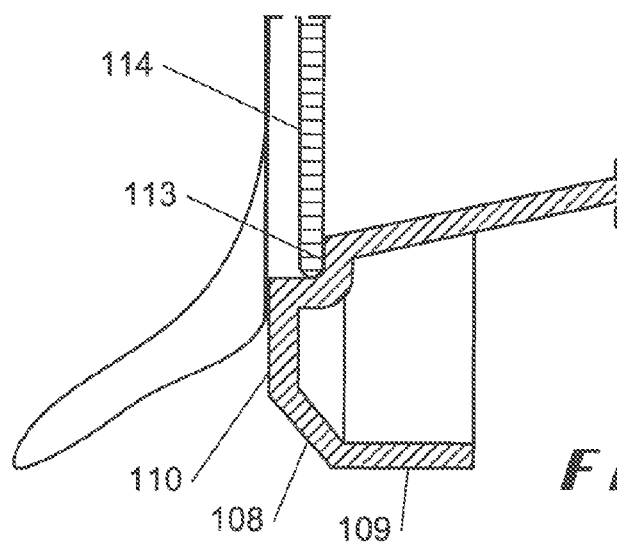

The rim 105 of the capsule 102, which is illustrated in greater detail in FIG. 2b, presents a substantially straight backwards taper 108. This substantially straight backwards taper 108 thus forms a surface extending in an outwards and backwards direction front the front face 103 of the capsule. Behind this taper 108, a backwards-oriented annular lip forms an outer perimeter surface 109 connected to said taper 108 and substantially parallel to said main longitudinal axis 107, whereas inwardly from the taper 108 the rim 105 presents a substantially flat front surface 110.

Before use, a freshness seal 111 formed by a foil fixed to said substantially flat front surface 110, closes the front face 103 of the capsule 102, so that its contents are isolated from the environment. The foil may be, for example, a metallized plastic foil heat-bonded to the substantially flat surface 110. As the interior of the capsule 102 is thus isolated from the environment in a substantially gas-tight manner, the infusible dry matter 101 within the capsule 102 may be preserved in a substantially inert atmosphere before use.

In this first embodiment, behind the rim 105, the solid envelope 105 forms an inwards step 112 presenting another substantially flat surface 113 to which is fixed a filter wall 114. This filter wall 114 may preferably be formed by a plastic mesh heat-bonded to said substantially flat surface 113. The filter wall 114 allows the flow of an infused liquid, while substantially blocking the passage of solid particles beyond a certain particle size.

In this first embodiment, the capsule 102 being injection-moulded, its back face 104 presents a plastic injection point 115 aligned with the central axis 107 of the capsule. Around this plastic injection point 115, an annular frangible region 116 is arranged for the injection of infusion liquid into the capsule. In this embodiment, this frangible region 116 is characterised by a thinner wall than the rest of the capsule 102. However, it could alternatively take other forms such as, for instance, a region made of a weaker material, a pre-cut orifice, eventually covered by a detachable or frangible lid, a non-reinforced area in a capsule presenting strengthening ribs or similar, and other alternatives readily available to the skilled person.

The back face 104 also presents an outer edge 117 oppositely tapered to the outer edge 108 of the front rim 105.

FIG. 2a represents the capsule 102 as it is being introduced in a receptacle 118 in a capsule carrier 119 in a device 120 for preparing infused beverages. The capsule carrier 119 has a substantially open structure with large lateral openings 121 for evacuating heat. The rim 122 of the receptacle 118, together with the surface 109 of the capsule 102 ensures that the capsule 102 is properly positioned. For this purpose, this rim 122 may also present an inwardly tapered surface (not illustrated).

Figure 2C:
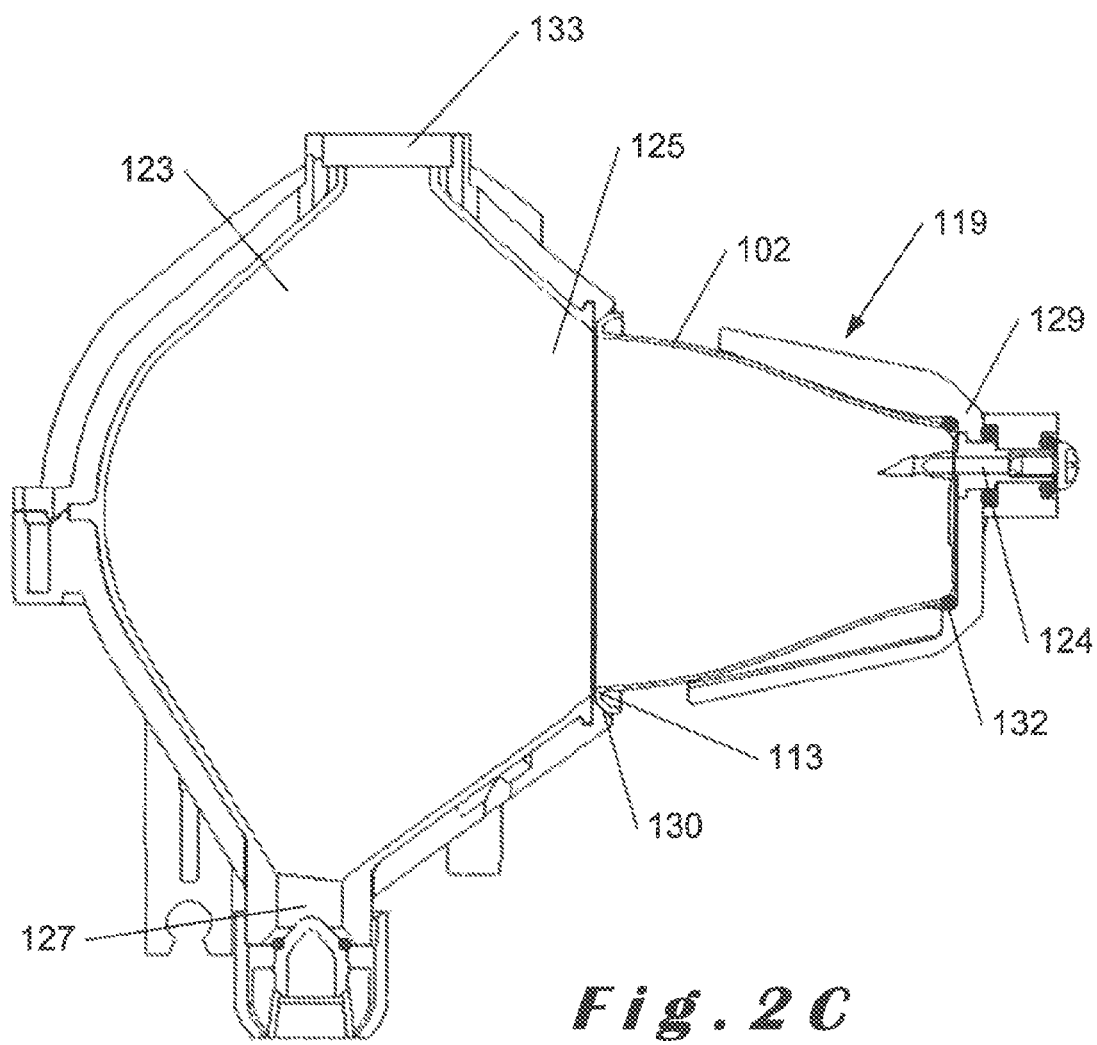
FIGS. 2c and 2d are side and upper views of the capsule of FIG. 2a in use in said corresponding device.
Figure 2D:
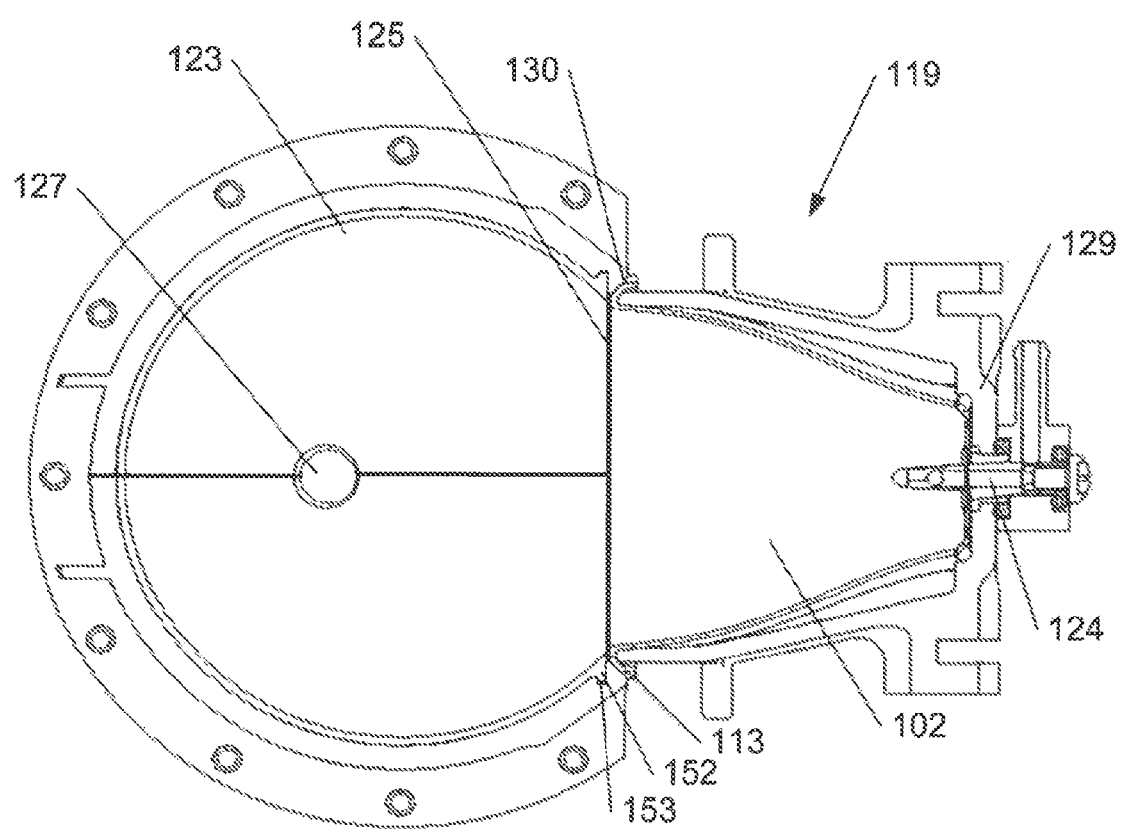

The device 120 for preparing infused beverages is illustrated in use in FIGS. 2c and 2d, and comprises, besides said capsule carrier 119, an infusion vessel 123, and infusion liquid injecting means 124 in the form of a hot water nozzle. The capsule carrier 119 is movably mounted in the device 120, so that, once the capsule 102 is in the receptacle 118, it can be displaced so as to place the front face 103 of the capsule 102 against a substantially vertical side opening 125 of said infusion vessel 123, as illustrated in FIGS. 2c and 2d. The device 120 may also comprise a device for opening the freshness seal 111, for instance by slicing it open during the movement of the capsule carrier 119 towards the position illustrated in FIGS. 2c and 2d.

Through the substantially vertical side opening 125, the infusion vessel 123 can thus be put in fluid connection with said front face 103 of the capsule 102. The infusion vessel 123 further comprises an openable and closable bottom opening 127 to allow an infused beverage to flow out of the chamber 123. It may also be provided with an upper vent to ensure a smooth discharge of said infused beverage.

In the illustrated position, a rear support 129 of the capsule carrier 119 pushes against the tapered outer edge 117 of the back face 104, so that the tapered outer edge 108 of the rim 105 is pressed against the rim 130 of the substantially vertical side opening 125 of said infusion vessel 123. The opposite tapers on the outer edges 108, 117 of, respectively, the rim 105 and the back face 104 ensure a self adjusting sealing fit on both sides. Since both the freshness seal 111 and the filter wall 114 are fixed to surfaces different from the taper 108, they will not interfere with this seal. This taper 108 is also less susceptible than a flat surface to surface damage such as bumps or scratches that could affect the leak-tightness of the seal.

The device 120 also comprises cleaning means 133, in this particular embodiment in the form of a rinsing nozzle near the top of the infusion vessel 123, for introducing a rinsing fluid into said infusion vessel 123. This rinsing fluid may be, for instance, water or steam.

Turning now to FIGS. 3 and 4, illustrating the infusion vessel 123, in order to ensure that the flavour and taste of the infusion beverage is substantially removed from the infusion vessel 123, so as to prevent contaminating subsequently prepared infusion beverages, the inner surface of the infusion vessel 123 comprises a fluoropolymer. Fluoropolymers are fluorinated polymers presenting low wettability and adhesion. A preferred fluoropolymer is perfluoroalkoxy (PFA) plastic, which is a thermoplastic allowing the injection moulding of particularly thin wall surfaces, thus saving both material and production costs. However alternative fluoropolymers such as, for instance, PTFE, FEP or ETFE may be used instead.

The infusion vessel 123 illustrated in FIGS. 3 and 4 comprises an inner shell 150 and an outer shell 151. Preferably, the inner shell 150, which in the illustrated embodiment is formed by injection moulded PFA, is substantially thinner than the outer shell 151, which provides the mechanical support and thermal insulation, and may be made from a cheaper material, such as, for instance, HDPE, as the anti-adhesive properties of fluoropolymers are not requested for it. As can be seen in FIGS. 2c and 2d, when the capsule 102 is placed against the side opening 125 of the infusion vessel 123, its taper 108 only contacts the outer shell 151 which provides the structural strength of the infusion vessel 123, ensuring better leak-tightness of this contact. A lip 152 of the inner shell 151 engages an undercutting 153 in the outer shell 151 inwards from the tapered rim 130 of said side opening 125, thus locking the inner shell 151 in place.

The inner shell 150 is divided by a vertical joint line into two inner half shells 150a and 150b, whereas the outer shell 151 is divided by a horizontal joint line into two outer half shells 151a and 151b. As the joint lines are not aligned, but instead intersect each other at a substantially perpendicular angle γ, it is prevented that infusing liquid from inside the infusion vessel 123 easily leaks through both joint lines. While in the illustrated example the angle γ equals approximately 90°, the same effect can also be achieved at less than perpendicular angles, for example at γ≥30°.

Figure 5:
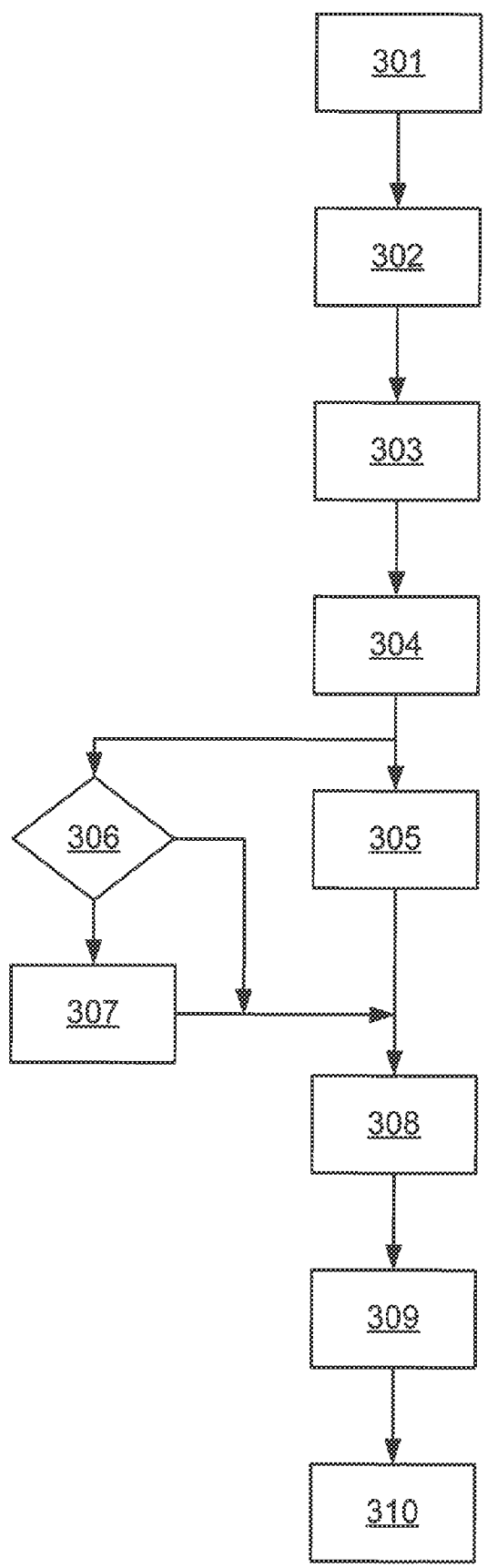
FIG. 5 is a flowchart representing a preferred embodiment of a method of preparing infused beverages according to the invention.

A method for preparing infused beverages according to the invention is illustrated by the flowchart of FIG. 5. In a first step 301, the capsule 102 is introduced in the receptacle 118 of the capsule carrier 119 of the device 120 for preparing infused beverages, as illustrated in FIG. 2a. Then, in the following positioning step 302, the capsule carrier 119 is first moved so as to align the front face 103 of the capsule 102 with the substantially vertical side opening 125 of said infusion vessel 123. During this movement, an opening device slices open the freshness seal 111 of the capsule 102. Once the capsule 102 is aligned with the side opening 125 of the infusion vessel 123, it is pushed forward by the rear support 129 until the tapered edges 108, 117 are in liquid-tight engagement with, respectively, said edge 130 of the substantially vertical side opening 125, and said rear support 129. The frangible region 116 is pierced by the infusion liquid injecting means 124.

In the next step 303, a code reader reads an identification code, such as a colour code, on the capsule 102, and selects a corresponding infusion program. This is followed by a first injection step 304 in which infusion liquid is injected into the capsule 102 through the infusion liquid injecting means 124, wherein both the quantity and temperature of the infusion liquid injected in this first injection step are determined by the injection program.

The injection program also determines the duration of the following infusion step 305, as well as, in a parallel step 306, whether a second injection step 307 is to be performed during the infusion 305, the moment in time at which this second injection step 307 will be performed, and the quantity and temperature of the infusion liquid to be injected in this second injection step 307.

At the moment determined by the infusion program, the device 120 will then execute the step 308 of discharging the infused beverage through the bottom opening 127 of the infusion vessel 123.

Once the infused beverage is discharged, the capsule carrier 119 may be moved again to remove the used capsule 102 from the receptacle 118 in a removal step 309. This may be followed by a cleaning step 310 wherein a rinsing fluid is introduced into said infusion vessel 123 through said cleaning means 133 and subsequently discharged.

A second embodiment of the invention is illustrated in FIGS. 6a, 6b and 7a to 7h. Instead of being rotationally symmetrical around a main axis, the capsule 202 is closed by an asymmetric envelope 206, which on its lower side 206a presents a substantially smaller angle α with respect to the front face 203, than on its substantially opposed upper side 206b. Because the capsule 202 of the illustrated embodiment is partially produced by injection moulding, both the angle α of the lower side 206a, and the angle β of the upper side 206b with respect to the front face 203 are smaller than 90°, so as to facilitate the extraction from the mould of the single injection moulded part formed by the envelope 206, the back face 204 and the rim 205. However, while the angle β of the upper side 206b is of about 85°, that of the lower side 206a is of just about 60°. As in the first embodiment, the capsule 202 presents a rim 205 around its front face 203.

Figure 6B:
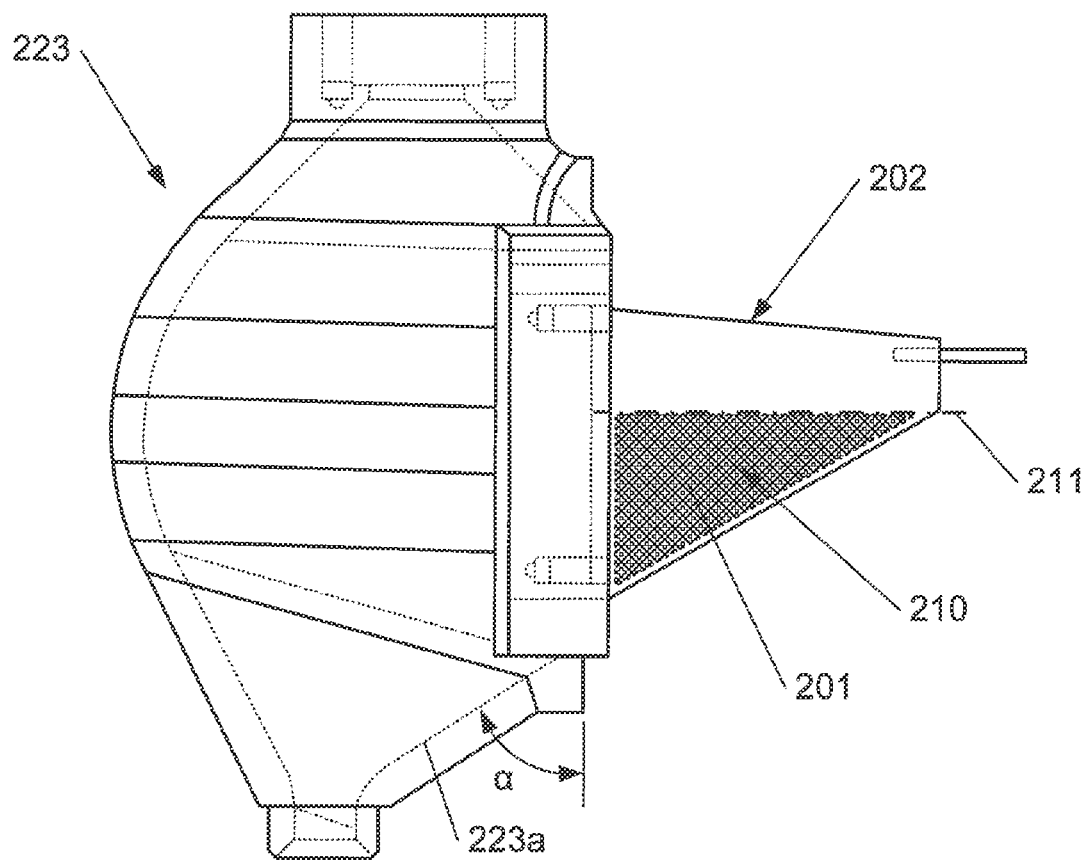
FIG. 6b is a view of the capsule of FIG. 6a in use in a corresponding device.
Figure 6A:
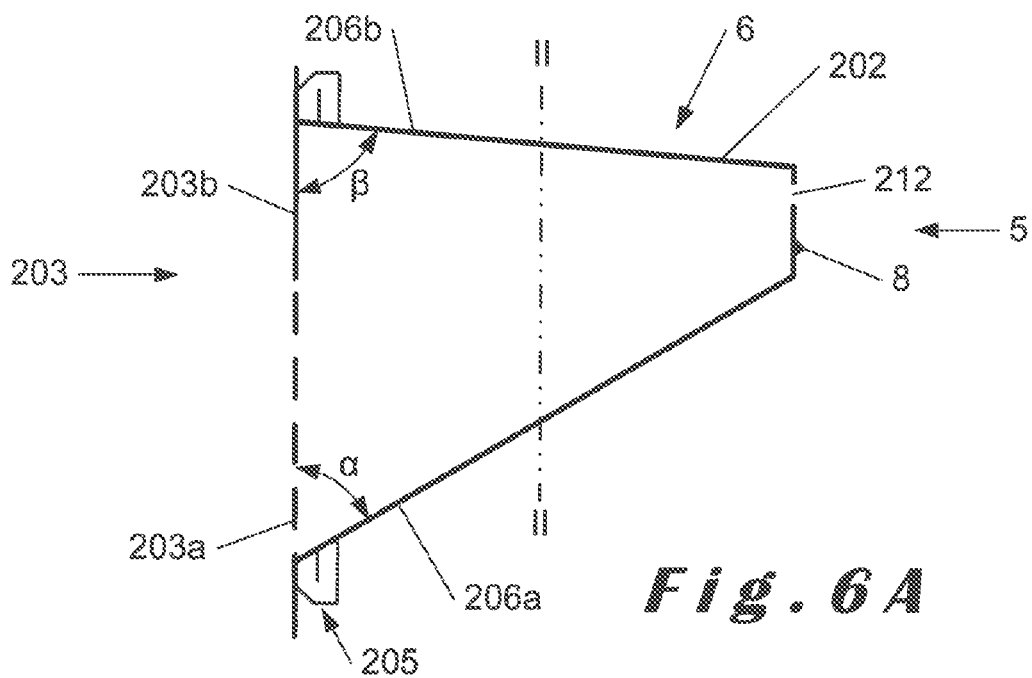
FIG. 6a is a longitudinal section of a second embodiment of a capsule according to the invention.

When the capsule 202 is in the illustrated position, the infusible dry matter 201 within collects in the troughlike space 210 delimited by the lower side 206a, the front face 203 and a horizontal plane 211 below the liquid injection point 212. Preferably, when the capsule 202 is placed against the infusion vessel 223, as illustrated in FIG. 6b, the inner wall of the latter presents a slope 223a in prolongation to said lower side 206a of the envelope 206 of the capsule which presents substantially the same angle α, thus facilitating the flow of infusion liquor out of the capsule 202.

The front face 203 is closed by a separate filter wall 203a and solid deflector wall 203b bonded onto the capsule 202. In use, when a jet of infusing liquid is injected into the capsule 202, this jet hits the solid deflector wall 203b and only indirectly flows onto the dry infusible matter 2.

Figure 7A:
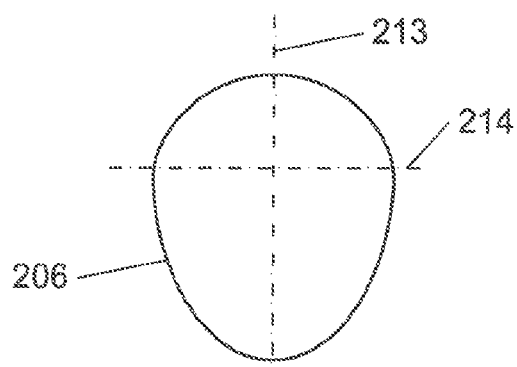
Figure 7B:
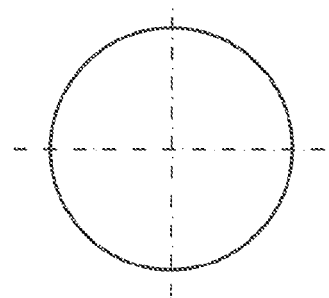
Figure 7C:
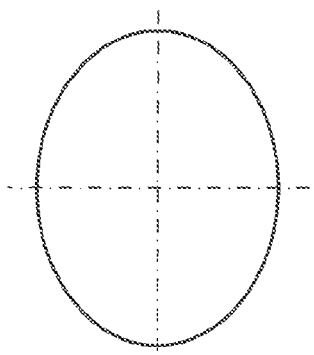
Figure 7D:
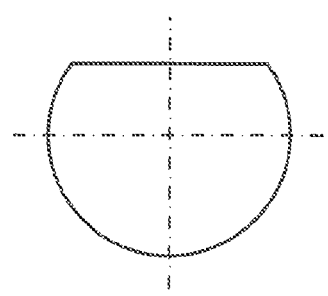
Figure 7E:
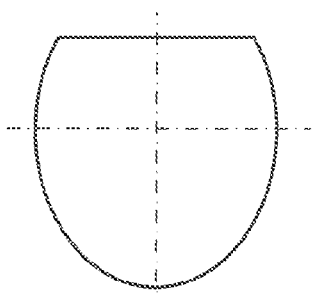
Figure 7F:
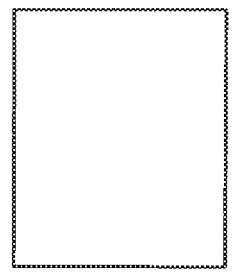
Figure 7G:
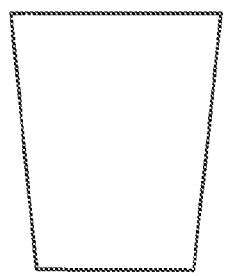
Figure 7H:

FIG. 7a illustrates the cross-section of the envelope 206. This ovoid cross-section has two main axes, a vertical axis 213 and a horizontal axis 214. While the vertical axis 213 is an axis of symmetry, the cross-section is elongated below the horizontal axis 214. Besides being aesthetically pleasing, this shape has the technical advantage of maximising the volume of the space 210 below the horizontal plane 211, while reinforcing its troughlike shape, and being relatively easy to produce by, for instance, injection moulding. However, alternative cross-sections could be considered, as illustrated, for instance, in FIGS. 7b to 7h. FIG. 7b illustrates an alternative embodiment of the capsule 202 with a circular cross-section of the envelope 206, FIG. 7c illustrates another alternative embodiment with an elliptical cross-section. FIGS. 7d and 7e illustrate, respectively, part-circular and part-elliptical alternative cross sections, wherein the upper part has been flattened. FIG. 7f illustrates an alternative square cross-section, FIG. 7g an alternative trapezoidal cross-section, wider on its upper side than on its lower side, and FIG. 7h another alternative cross-section in the shape of a downwardly pointing triangle.

Although the present invention has been described with reference to specific exemplary embodiments, it will be evident that various modifications and changes may be made to these embodiments without departing from the broader scope of the invention as set forth in the claims. For instance, the front surface 110 may receive both the freshness seal 111 and the filter wall 114 in a capsule 102 without an inwards step 112. Also, although the surfaces 110 and 113 are described as "substantially flat", they may present ridges or protrusions to facilitate the adhesion of freshness seal 111 and filter wall 114. Accordingly, the description and drawings are to be regarded in an illustrative sense rather than a restrictive sense.

The invention claimed is:

1. A device (120) for preparing infused beverages comprising:
   a capsule (102,202) containing dry infusible matter (101) for preparing infused beverages, and including:
      a front face (103,203) comprising a filter wall (114);
      a rim (105,205) surrounding said front face (103,203);
      a back face (104,204), substantially opposed to said front face (103,203) along a main longitudinal axis (107) of the capsule (102,202), and comprising a frangible region (116,216) for the injection of infusing liquid; and
   a solid envelope (106,206) between said rim (105,205) and said back face (104), said rim (105,205) presenting an outer edge with a backwards-oriented annular lip behind a substantially straight backwards taper (108), said annular lip presenting an outer perimeter surface (109) connected to said taper (108) and substantially parallel to said main longitudinal axis (107); and
   injecting means (124) for introducing an infusing liquid into said capsule (102,202) through said frangible region (216); and
   an infusion vessel (123) having a side opening (125) with a rim in substantially leak-tight engagement with said substantially straight backwards taper (108) of the rim (105) of the capsule (102,202).

2. A device (120) according to claim 1, wherein said infusion vessel (123) is at least partially made of a fluoropolymer material.

3. A device (120) according to claim 2, wherein said infusion vessel (123) comprises an inner shell (150) at least partially made of said fluoropolymer material, and encased in an outer shell (151) of a different material.

4. A device (120) according to claim 3, wherein said inner shell is molded.

5. A device (120) according to claim 4, wherein said fluoropolymer material comprises perfluoroalkoxy plastic.

6. A device (120) according to claim 2, wherein said inner shell (150) comprises two inner half-shells (150a,150b) divided by a first joint line, and said outer shell (151) comprises two outer half-shells (151a,151b) divided by a second joint line.

7. A device (120) according to claim 6, wherein said first and second joint lines intersect at an angle γ higher than 30°.

8. A device (120) according claim 1, wherein said capsule (102) is received in a receptacle (118) of a capsule carrier (119) with a significantly open structure.

9. A device (120) according to claim 1, further comprising a nozzle for introducing a rinsing fluid into said infusion vessel (123).

* * * * *